Oct. 13, 1959     L. J. FURMAN ET AL     2,908,205
WORK CLAMP HAVING A COMBINED RECTILINEAR AND PIVOTAL MOTION
Filed May 24, 1957
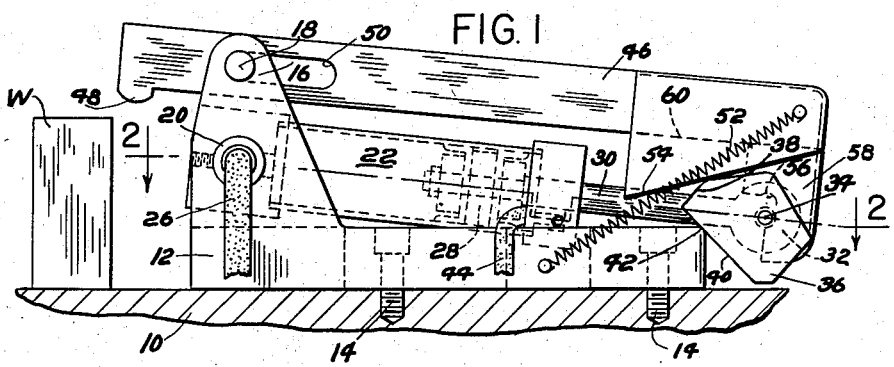
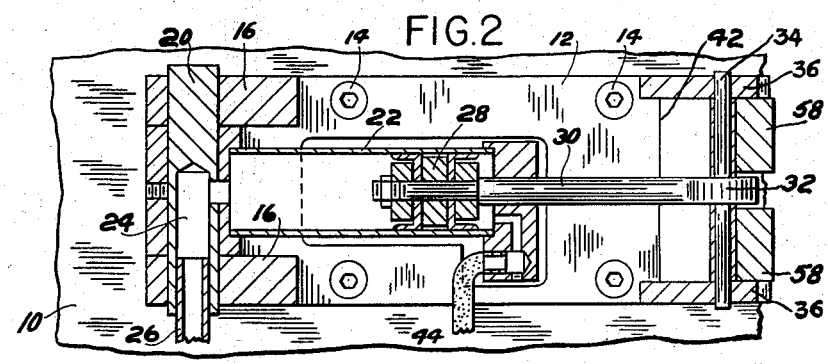
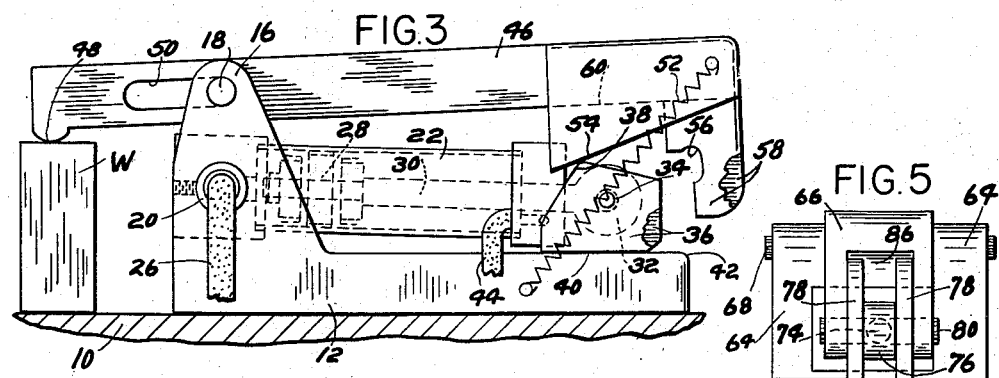
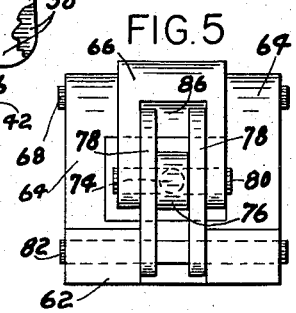
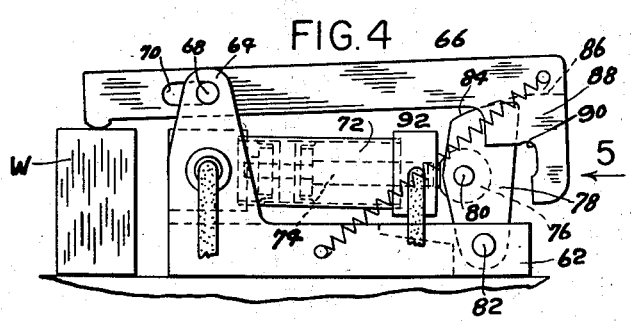
INVENTORS
LOUIS J. FURMAN
LEONARD L. KRASNOW
ATTORNEY

United States Patent Office 2,908,205
Patented Oct. 13, 1959

2,908,205

WORK CLAMP HAVING A COMBINED RECTILINEAR AND PIVOTAL MOTION

Louis J. Furman and Leonard L. Krasnow, Worcester, Mass., assignors to Lodding, Inc., Worcester, Mass., a corporation of Massachusetts Application May 24, 1957, Serial No. 661,426

3 Claims. (Cl. 90—59)

This invention relates to a new and improved power-operated work clamp particularly for machine tools or the like including a work-clamping member capable of combined rectilinear and pivotal motions, in combination with power-operated means for actuating the same, said means including a cam member pivotably mounted with relation to the power means, said cam member being provided with means inter-engaging with the clamping member for the purpose of first moving said clamping member rectilinearly from a position for instance out of alignment with the workpiece to be held into a superposed position with respect thereto, and said cam device cooperating with a cam surface on said clamping member thereupon and thereafter pivoting the clamping member in a direction to quickly and firmly clamp the workpiece to a machine tool bed or the like.

A further object of the invention resides in the provision of a power-operated clamp comprising a base, a clamping member longitudinally slidable and pivotable upon said base, a power-operated piston on the base, and means for operating the same in both directions, a cam member pivoted with relation to the piston and having extending pins for inter-engagement with corresponding notches on the clamping member, and said clamping member also including a cam surface, said cam member operating thereby the clamping member to move the same rectilinearly and then pivotably in sequence to first move the clamping member to position over the workpiece and then to clamp the workpiece; and the provision of a clamp as above described whereby the clamping member is quickly and easily operated by the same mechanism in reverse to release the workpiece and then to move the clamping member out of superposed position for quick and easy removal and replacement thereof.

Other objects and advantages of the invention will appear hereinafter.

Reference is to be had to the accompanying drawings, in which

Fig. 1 is a view in side elevation illustrating the invention in work unclamped relation, part being in section;

Fig. 2 is a section on line 2—2 of Fig. 1;

Fig. 3 is a view similar to Fig. 1 illustrating the invention in operative clamped relation with respect to a workpiece;

Fig. 4 is a view in elevation on a smaller scale illustrating a modification; and Fig. 5 is a view in end elevation, looking in the direction of arrow 5 in Fig. 4.

The reference numeral 10 indicates a platen or bed of a machine of any kind with relation to or upon which it is desired to clamp a workpiece W, as for instance to operate upon the same by means of a tool or for any other purpose.

Mounted upon the bed 10, there is a clamp base member 12 which may be secured removably in position upon the bed by any desired means, such as screws or bolts 14. At one end of the base member 12 there are a pair of spaced uprights 16 which mount between them a fixed pin 18 and below the pin there is a pivot member 20 forming a support for a fluid or hydraulic cylinder 22. The member 20 also provides a fluid power inlet as at 24 to which may be connected a supply pipe or hose 26.

The cylinder 22 contains a piston 28 and piston rod 30, the latter being capable of extending out of the cylinder to the rear of the device in a direction opposite the workpiece as clearly shown in Fig. 1. The piston rod 30 terminates in a head 32 through which extends an elongated pin 34 to both sides thereof. On pin 34 there is pivotally mounted a cam block or blocks 36 which may be secured together in any way or which may be separate, one portion thereof being located at each side of head 32. The cam members 36 are each provided with similar upper camming surfaces 38 and opposite or lower straight operative surfaces 40. As the piston rod 30 reciprocates, the cam members 36 move therewith, but as they are loosely mounted on the pin 34, the cam members 36 are in part pivoted on the rear edge or corner 42 of the clamp base 12 as a fulcrum, as is clearly shown in Fig. 1. The cam member then slides on the base 12. A fluid inlet 44 is utilized to move the piston in a direction opposite to the motion due to pressure at inlet 24.

Mounted on pin 18 there is a clamping member 46 located between the uprights 16. This clamping member is elongated as shown and has a clamping jaw 48 which is adapted to impinge upon the workpiece W and clamp the same in position as shown in Fig. 3. The clamping member 46 is provided with an elongated slot 50 through which the pin 18 passes. The clamping member is otherwise unconstrained except for the presence of a spring 52 which holds it down, and also may apply a force toward the clamping position.

At the end of the clamping member 46 opposite the jaw 48, the same is provided with inclined cam surfaces 54 which are located in the same vertical plane with cam members 36. The member 46 terminates rearwardly in a pair of spaced depending hook-like members 58 each having a vertically elongated open-sided notch 56 therein. The members 58 being spaced, include between them the head 32. However, the cam surfaces 54 extend outwardly to be vertically aligned with cam surfaces 38 so that as seen in Fig. 3 the cam surfaces impinge upon each other, when the piston is drawn to the left as in Fig. 3.

In the operation of the device, the workpiece W is located in predetermined position as shown in Fig. 1 and the operating fluid is then caused to enter the cylinder through inlet 44, causing piston rod 30 to move to the left. At the initiation of this motion, the surfaces 40 riding on corner 42 as a fulcrum cause the cam members 36 to rise, carrying therewith pin 34 which becomes engaged in notch 56.

Continued motion to the left then results in the carrying of the entire jaw member 46 to the left to a position where the jaw 48 is above the workpiece W and this substantially rectilinear motion is provided for by slot 50. When pin 18 reaches the right-hand end of slot 50 as in Fig. 3 while the piston continues its leftward motion, the cam surfaces 38 impinge upon that at 54, causing the right-hand end of the clamping member 46 to rise, i.e. to move in a counter-clockwise direction, and this of course results in the jaw member 48 being depressed to firmly clamp the workpiece W in the desired position.

Upon the admission of operating fluid through the connection 26, the piston 28 starts to move in the opposite direction. First of course the pressure on the workpiece is released and spring 52, maintaining the cam surface 54 in contact with that at 38, provides for release of the workpiece by moving the clamping member 46 in a clockwise direction. Eventually the pin 34 reaches notch 56 and the right-hand end of clamping member 46 has dropped. At that point, pin 34 is received again in its notches, whereupon continued rearward motion causes the clamping member 46 to be fully retracted to the Fig. 1 position where the workpiece is completely free and clear of the clamping member. The clockwise rotation of cam 36 on edge 42 causes jaw 48 to rock farther away from work W, thus creating additional clearance for removal and installation of work W.

The modified form of the device is shown in Figs. 4 and 5. In this case there is provided a clamp base 62 having uprights 64 or the like, as before, mounting jaw member 66 on pin 68, the latter passing through slot 70. A power-operated cylinder 72, similar to that above described, is provided with a piston and a piston rod as indicated at 74, the latter terminating in a head 76 to which is pivotally mounted cam members 78 by means of laterally extending pin 80.

The cam members 78 in this case are pivoted to base 62 by means of a pin 82 and are provided with the cam surfaces 84 which are adapted to impinge upon a cam surface 86 on the clamping member 66. Also the clamping member 66 is provided with downwardly extending legs 88 having the notches 90 which are similar to those at 56 above described.

In general, the modified clamp operates somewhat the same as the one originally described. Starting with the clamping member 66 in clamping condition, it will be seen that cam surface 84 holds the clamping member 66 in clamping position by impingement on cam surface 86. Upon a right-hand motion of piston rod 74, the cam members 78 are pivoted about pin 82 in a clockwise direction to release cam surface 86, whereupon the spring 92 releases the clamping member from the workpiece, and continued right-hand motion of piston rod 74 causes pin 80 to engage in notch 90 and to retract the clamping member 66 from vertical alignment with workpiece W, the same as above described with respect to Fig. 1. Due to the inclination of surfaces 54 relative to the direction of motion of plunger 30, the combination therewith of cam members 36 provides for a self-locking action of the clamping member so that if the power fails, the work is still positively clamped even without the pressure afforded by the power cylinder. The same relationship is true with respect to Fig. 4 as the angle of cam surface 86 with respect to that at 84 results in the same self-locking action of the clamp.

Having thus described our invention and the advantages thereof, we do not wish to be limited to the details herein disclosed, otherwise than as set forth in the claims, but what we claim is:

1. A power-operated work clamp comprising a base, an elongated work-clamping member thereon, means mounting the member for a combined initial rectilinear and subsequent pivotal motion in the work-clamping direction, a work-clamping jaw adjacent one end of the member, a power cylinder on the base, a piston rod therefor, a cam on the piston rod, means mounting said cam to swivel with respect to the piston rod, a pin on the piston rod, said cam and pin being bodily movable with the piston rod, means on the work-clamping member to receive the pin and connect the work-clamping member to the piston rod for initial rectilinear motion of the member toward the work-clamping position, means subsequently raising the cam relative to said base to engage the member and pivot the same at a predetermined point in the travel of the piston rod to move the work-clamping jaw relative to the base to clamp the work, means to hold the work-clamping member yieldably downwards against the raising action of the cam so that the jaw is retracted from work-clamping condition upon initial retraction of the cam, means on the work-clamping member in the path of the pin to retract the work-clamping member rectilinearly upon further retraction of the cam, said cam raising means comprising an abutment on the base to raise the cam swivelly upon motion of the piston rod to move the work-clamping member toward work-clamping position and to provide for dropping of the cam by gravity at the end of the retractive stroke of the piston rod, the latter extending past the abutment means in this position.

2. A power-operated work clamp comprising a base, an elongated work-clamping member thereon, means mounting the member for a combined rectilinear and pivotal motion, a work-clamping jaw adjacent one end of the member, a power cylinder on the base, a piston rod therefor, a cam mounted on the piston rod, a pin on the piston rod, said cam and pin being movable with the piston rod between work-clamping and releasing position thereof, means on the work-clamping member to receive the pin and connect the member to the piston rod for rectilinear motion of the member, abutment means on the base raising the cam relative to said base to engage the member and pivot the same at a predetermined point in the travel of the piston rod, said cam being pivoted on the piston rod on an axis transverse to the length thereof.

3. The power-operated work clamp of claim 2 including a surface on the work-clamping member engaged by the cam, said surface being inclined relative to the piston rod and its path of rectilinear motion, said inclined surface and cam locking the work-clamping member in work-clamping position until the piston moves from work-clamping position toward the releasing position thereof.

References Cited in the file of this patent
UNITED STATES PATENTS

| | | |
|---|---|---|
| 2,160,378 | Balsiger | May 30, 1939 |
| 2,627,210 | Kear | Feb. 3, 1953 |